United States Patent
Patwardhan et al.

(10) Patent No.: US 9,489,267 B1
(45) Date of Patent: Nov. 8, 2016

(54) OPTIMIZATION TO PERMIT BLOCK BASED INCREMENTAL BACKUP ACROSS SYSTEM REBOOT OR CRASH

(71) Applicant: EMC Corporation, Hopkinton, MA (US)

(72) Inventors: Kedar Shrikrishna Patwardhan, Pune (IN); Anand Shrikrishna Ghatnekar, Pune (IN)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/576,943

(22) Filed: Dec. 19, 2014

(51) Int. Cl.
  *G06F 12/00* (2006.01)
  *G06F 11/14* (2006.01)
  *G06F 3/06* (2006.01)

(52) U.S. Cl.
  CPC .......... *G06F 11/1451* (2013.01); *G06F 3/065* (2013.01); *G06F 3/0619* (2013.01); *G06F 3/0683* (2013.01)

(58) Field of Classification Search
  CPC .......... G06F 11/1469; G06F 2201/84; G06F 11/1451
  See application file for complete search history.

(56) References Cited

U.S. PATENT DOCUMENTS

| | | | | |
|---|---|---|---|---|
| 8,082,231 B1* | 12/2011 | McDaniel | ........... | G06F 11/1453 707/681 |
| 8,996,468 B1* | 3/2015 | Mattox | ................... | G06F 17/30 707/650 |
| 9,003,143 B1* | 4/2015 | Barnes | ................ | G06F 11/1451 711/162 |
| 2010/0274980 A1* | 10/2010 | Stringham | .......... | G06F 11/1441 711/156 |
| 2015/0081993 A1* | 3/2015 | Christopher | ........ | G06F 11/1451 711/162 |

* cited by examiner

*Primary Examiner* — David X Yi
*Assistant Examiner* — Arvind Talukdar
(74) *Attorney, Agent, or Firm* — Van Pelt, Yi & James LLP (57) ABSTRACT

Techniques to back up data are disclosed. In various embodiments, a copy of a free block map as of a first time associated with a first backup is stored in persistent data storage. Writes made subsequent to the first backup to blocks not listed as free in the copy of the free block map as of the first time are tracked in a persistently-stored change block tracking log. A free block map as of a second time and the previously-stored copy of the free block map as of the first time are used to determine which blocks listed as free in the free block map as of the first time have been written to since the first time. At least a subset of blocks determined to have been written to since the first time are including in an incremental backup.

17 Claims, 6 Drawing Sheets

OPTIMIZATION TO PERMIT BLOCK BASED INCREMENTAL BACKUP ACROSS SYSTEM REBOOT OR CRASH

BACKGROUND OF THE INVENTION

In prior approaches to block based incremental backup a trade-off typically had to be made between tracking and logging in a persistently-stored change block log all blocks modified since a previous backup, which would enable incremental backups to be performed even after system reboot and/or crash but which consumed resources (e.g., time, storage) and potentially could impact performance, and not tracking changed blocks in a persistently-stored log, which resulted in a full backup operation being required in the event of a system reboot and/or crash.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Using a persistently stored map of blocks that were free at a time associated with a prior backup to perform a subsequent incremental block based backup is disclosed. In various embodiments, at a time a full and/or incremental backup is performed, a copy of a free block map (or other data structure) as of the time of the backup is extracted from a file system with which the backup is associated. The extracted copy of the free block map is stored persistently for future use to perform a subsequent incremental backup. In various embodiments, blocks that are subsequently modified are tracked in a persistently-stored change block log only if they were not in the previously-stored free block map. For example, all such blocks in some embodiments are pre-marked as "modified" in an in-memory change block tracking log. At the time of a subsequent incremental backup, the persistently-stored copy of the free block map as of the last backup is compared to a then-current free block map. Blocks that are determined based on the comparison to have been free as of the prior backup but no longer are listed as free as of the current backup are included in the incremental backup.

Figure 1:
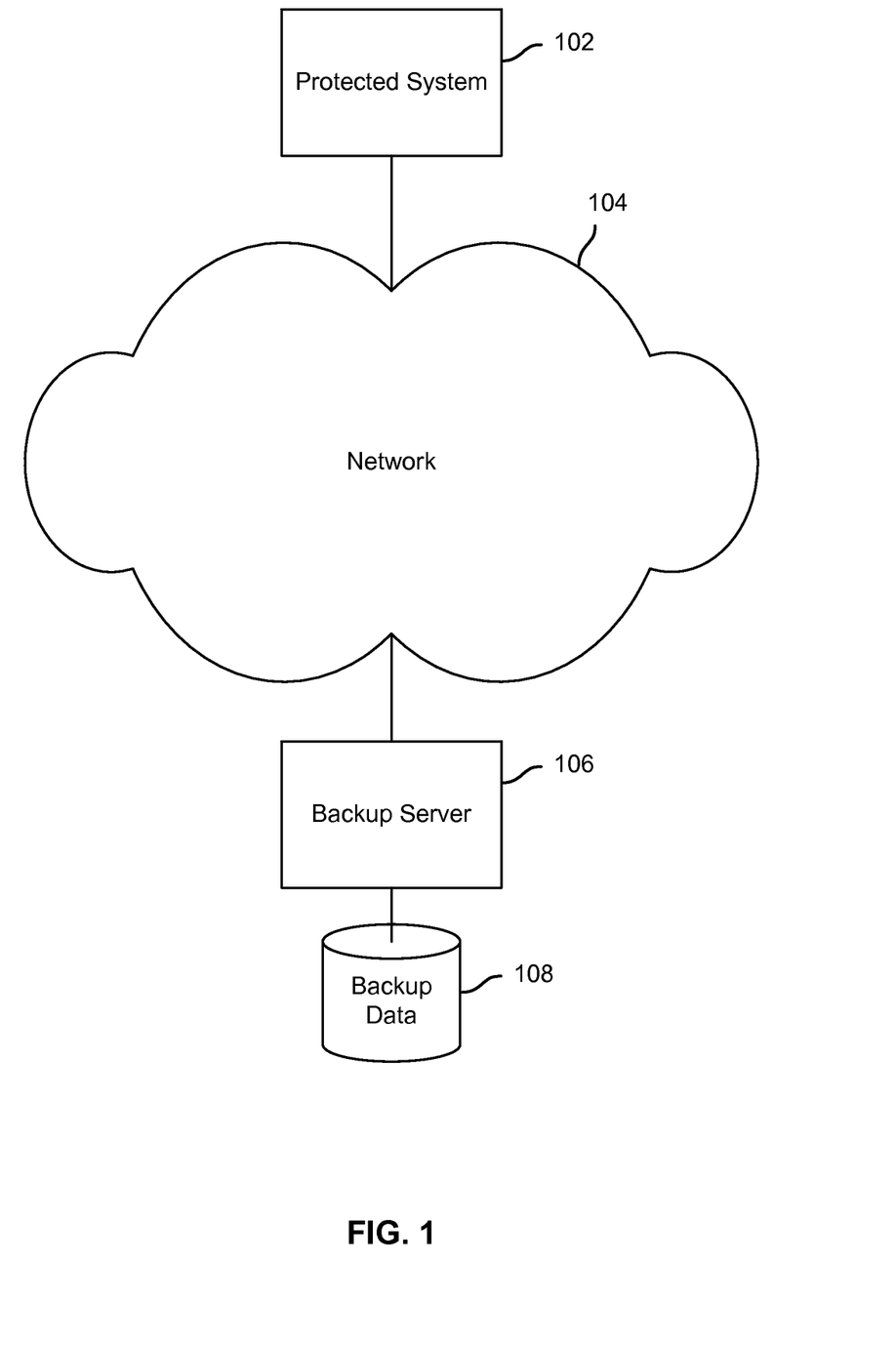
FIG. 1 is a block diagram illustrating an embodiment of a backup system and environment.

FIG. 1 is a block diagram illustrating an embodiment of a backup system and environment. In the example shown, a protected system 102, e.g., a file server, networked client computer system, etc., is connected via a network 104, e.g., a local area network (LAN), storage area network (SAN), the Internet, etc., to a backup server 106 configured to store backup data in a backup media 108, such as optical or other disk drives, magnetic tapes, etc. In some embodiments, a backup client or other backup agent running on protected system 102 coordinates the backup of data from protected system 102. For example, the backup client may cooperate with backup server 106 to store on backup media 108 a backup copy of data that resides on protected system 102. In various embodiments, a block-based backup may be performed. In a block-based backup, blocks of data as stored on a storage drive of a protected system, such as protected system 102, may be transferred to and stored in backup media, such as backup media 108, at the block level, as opposed to as files or other logical objects.

In some embodiments, an incremental block-based backup may be performed. For example, the Networker® backup solution provided by EMC® Corporation includes a change block tracking (CBT) driver which can be used to track which blocks have been written to since a last backup, such as a last full backup. When an incremental backup is to be performed, only those blocks that have been changed since the last backup are included in the incremental backup.

Figure 2:
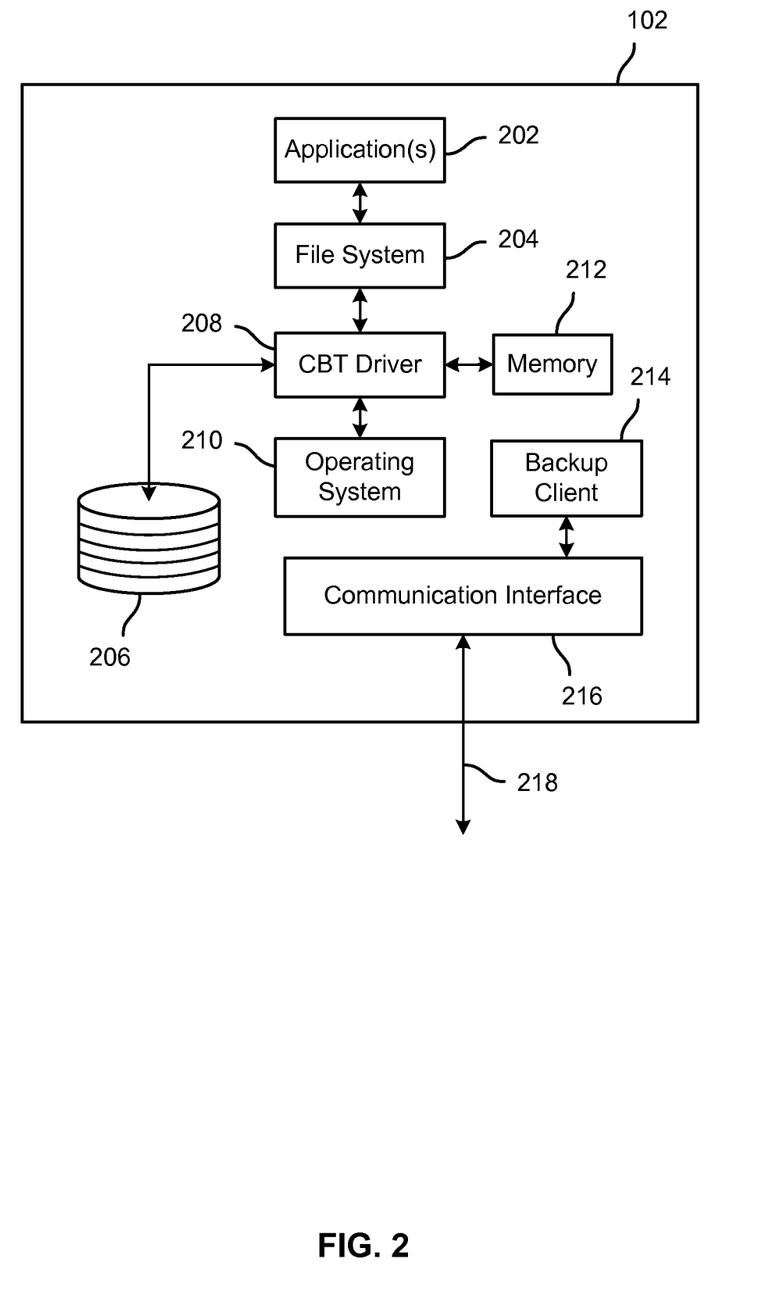
FIG. 2 is a block diagram illustrating an embodiment of a system to perform incremental block based backup.

FIG. 2 is a block diagram illustrating an embodiment of a system to perform incremental block based backup. In the example shown, the protected system 102 of FIG. 1 includes one or more application(s) configured to use a local file system 204 to store application objects, such as files, persistently on a local disk (or other non-volatile storage) drive 206. A change block tracking (CBT) driver 208 has been integrated with the operating system 210 in this example to intercept writes to storage blocks on drive 206. If writes relate to a protected volume, for example, in various embodiments the changed blocks may be logged in an in-memory change block log stored in memory 212. In various embodiments, as described herein, changed blocks added to the in-memory log may be propagated to a corresponding persistently-stored change block log (or other persistently-stored data structure) stored on drive 206.

A backup client 214, e.g., a Networker® backup client/agent, is installed on the protected system 102 and manages backup operations on protected system 102. For example, the backup client 214 may perform an incremental backup by transmitting to a remote backup server, via a communication interface 216 and associated network connection 218, data stored in blocks changed since a last backup.

In various embodiments, free block maps maintained by a file system with which a protected volume or other set of stored data is associated are used to reduce the number of changed blocks that have to be tracked during file system operations that occur between backups, e.g., as explained and illustrated below with reference to FIGS. 3 through 6.

Figure 3:
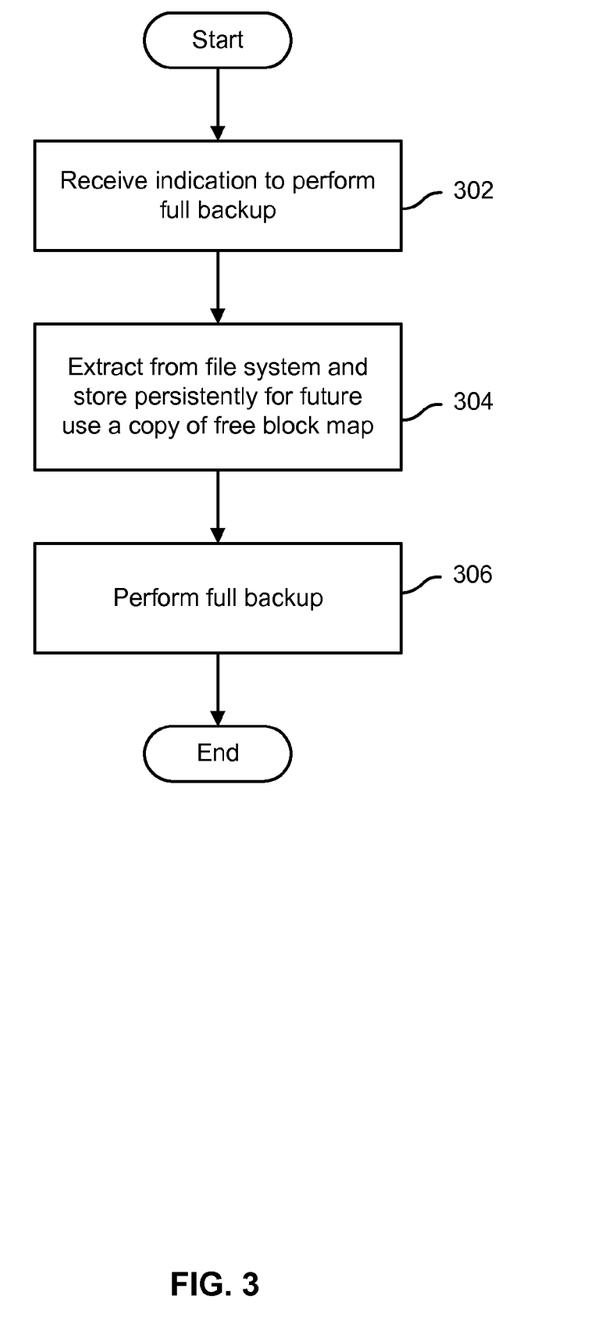
FIG. 3 is a flow chart illustrating an embodiment of a process to perform a full backup.

FIG. 3 is a flow chart illustrating an embodiment of a process to perform a full backup. In the example shown, an indication is received to perform a full backup (302). A copy of a free block map for the protected volume, LUN, or other data set is extracted from a file system with which the protected data is associated and is stored persistently, e.g., on a local disk or other drive (304). A full backup is performed (306).

Figure 4:
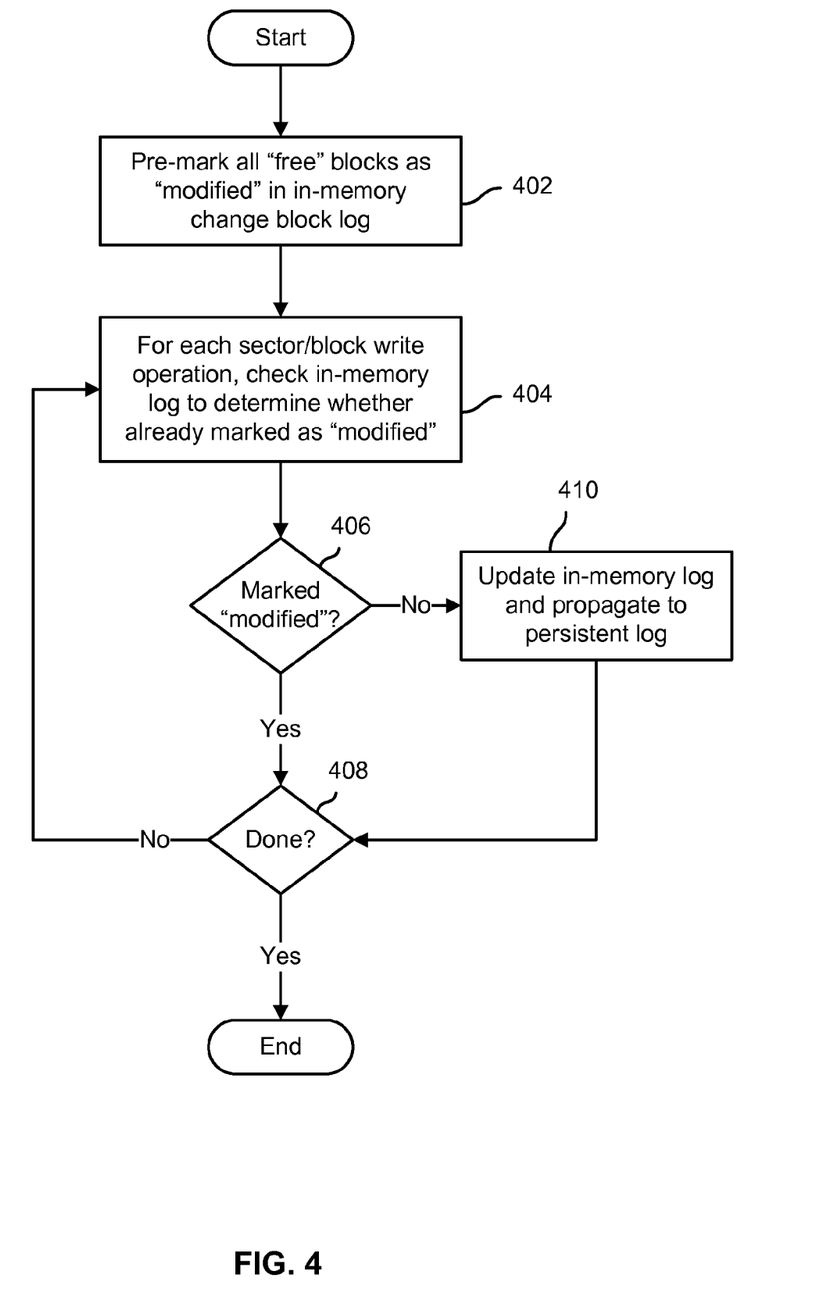
FIG. 4 is a flow chart illustrating an embodiment of a process to track changed blocks.

FIG. 4 is a flow chart illustrating an embodiment of a process to track changed blocks. The process of FIG. 4 may begin, for example, at the conclusion of a full (or other) backup, e.g., as in FIG. 3. Blocks indicated as "free" as of the time of the immediately prior backup are pre-marked as "modified" in an in-memory change block log (402). Subsequently, for each sector/block write operation, the in-memory log is checked to determine whether the sector/block has already been marked as "modified" (404). If so, nothing further is done and processing continues with the next write operation (if any) (408). If the sector/block that has been written to has not yet been marked as "modified" (406), the in-memory log is updated to reflect that the sector/block has been modified and the update is propagated to the persistently-stored change block log (410). Note that since blocks list as "free" on the previously-stored copy of the free block map as of the time of the last backup were pre-marked as "modified" in the in-memory log (402), writes to free blocks that occur subsequently to a free block or range of blocks will not, in various embodiments, result in the in-memory log being updated with data subsequently propagated to the persistently-stored log (see, e.g., 406, 410) at the time such a write operation is intercepted by the CBT driver or other entity. Instead, in various embodiments, only writes to sectors/blocks that were not "free" as of the last backup will be detected and logged in both the in-memory and persistently-stored logs.

Figure 5:
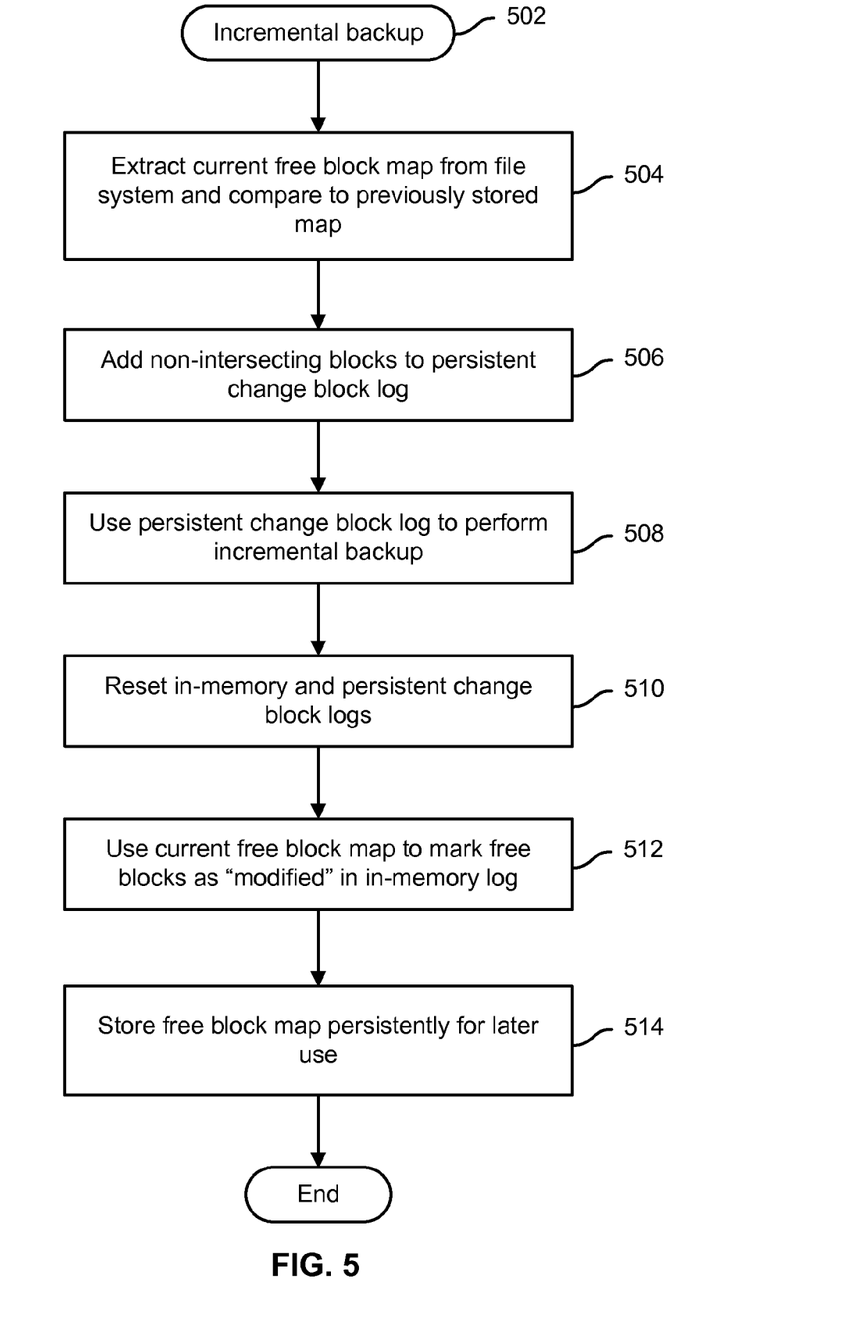
FIG. 5 is a flow chart illustrating an embodiment of a process to perform an incremental backup.

FIG. 5 is a flow chart illustrating an embodiment of a process to perform an incremental backup. An indication to perform an incremental backup is received (502). A current (i.e., as of the time of the current backup) free block map is extracted from the file system and compared to the free block map that was extracted from the file system and stored persistently at the time of the last (e.g., full) backup (504). Non-intersecting blocks, i.e., those that were listed as free in the copy of the free block maps as of the time of the last backup but are no longer listed as free in the current free block map, are added to the persistently-stored change block log (506). In this single operation, all previously "free" blocks that have been written to since the last backup become added to the persistently-stored change block log, without requiring such writes to have been reflected in the persistent log as such writes were intercepted. The persistently-stored change block log is used to perform the incremental backup (508). For example, blocks indicated in persistently-stored change block log as having been modified since the last backup, which include those blocks marked as "modified" as changes to blocks that were not previously "free" were intercepted and those blocks that were listed as "free" as of the last backup but are no longer listed as "free" as of the current backup, will be backed up in various embodiments. The in-memory and persistent change block logs are reset (510). The current free block map is used to pre-mark free blocks as "modified" in the in-memory log (512) (as in step 402 of FIG. 4), and the current free block map is stored persistently (514) (as in step 304 of FIG. 3) for future use, e.g., in connection with a next incremental backup.

Figure 6:
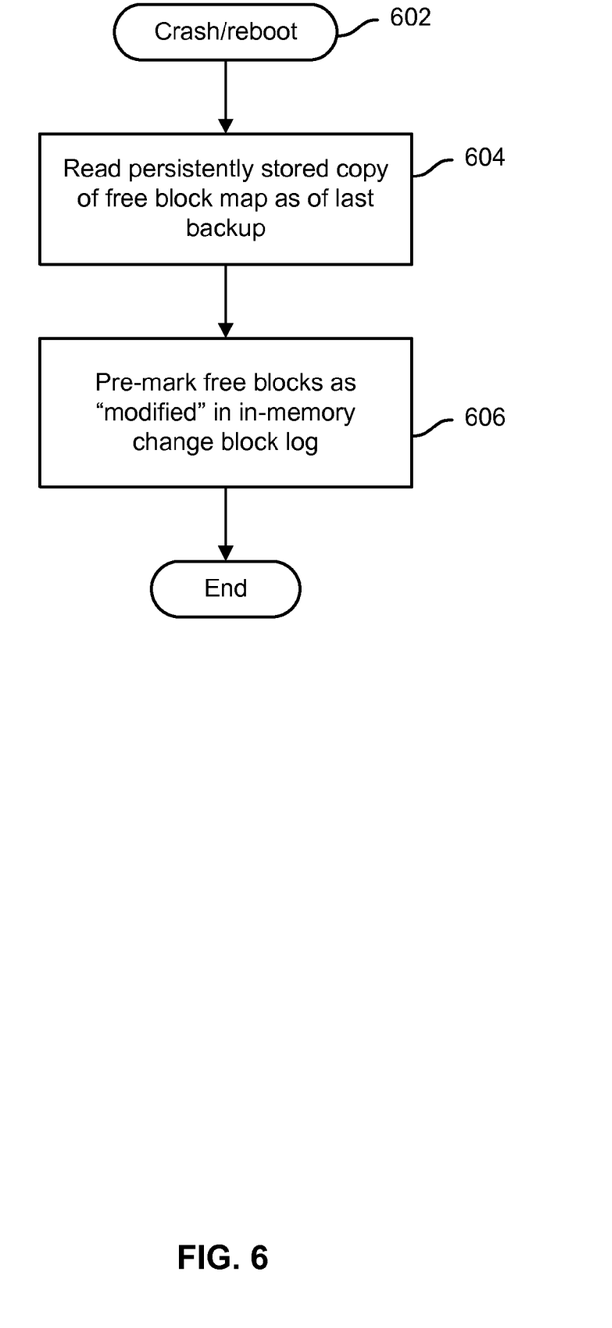
FIG. 6 is a flow chart illustrating an embodiment of a process to restore an in-memory change block log after system crash and/or reboot.

FIG. 6 is a flow chart illustrating an embodiment of a process to restore an in-memory change block log after system crash and/or reboot. In the example shown, in the event of a system crash and/or reboot (602), the copy of the free block map stored most recently in persistent storage, e.g., in connection with the most recent backup is read from the persistent storage (604) and used to pre-mark as "modified" in the in-memory change block tracking log (once again, since the same operation would have been performed in connection with the last backup, as in step 402 of FIG. 4 and/or step 512 of FIG. 5) those blocks listed as being "free" in the map (606). Note that in various embodiments writes to blocks other than those listed as free in the persistently-stored copy of the free block map as of the last backup would have been stored in the in-memory log, which would be lost in the event of crash and/or reboot, but also in the persistent log, as in step 410 of FIG. 4. As a result, using the previously-stored free block map subsequent to a system crash and/or reboot to pre-mark as "modified" those blocks listed as "free" in the map enables the techniques disclosed herein to be used to perform an incremental block-based backup reliably even after a system crash and/or reboot, without having to track in the persistent change block log at the time they are made writes to blocks that were free until that time.

Using techniques disclosed herein, block-based incremental backups may be performed, including after system crash and/or reboot, without having to incur the cost of tracking in a persistently-stored change block log as they occur all writes since a last backup.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of backing up data, comprising:
   storing in persistent data storage a copy of a free block map as of a first time associated with a first backup;
   in response to the first backup,
      premarking all blocks in the free block map that were identified as free at a time of the first backup as modified;
      premarking all blocks in a persistently-stored change block tracking log that were identified as free at a time of the first backup as modified;
      tracking in the persistently-stored change block tracking log writes made subsequent to the first backup to blocks not listed as free in the copy of the free block map as of the first time, including logging only writes to sectors or blocks that were not identified as free as of the time of the first backup;

for each block write operation, determining whether a block associated with the block write operation is identified as modified in the persistently-stored change block tracking log, and in the event that the block is identified as modified in the persistently-stored change block tracking log, maintaining an indication of the block in the persistently-stored change block tracking log as being modified; and in the event that the block is not identified as modified in the persistently-stored change block tracking log, updating the persistently-stored change block tracking log to identify the block as modified;

determining that an incremental backup is to be performed at a second time subsequent to the first time;

determining which blocks listed as free in the free block map as of the first time have been written to since the first time based at least in part on comparing a free block map as of the second time and the previously-stored copy of the free block map as of the first time;

adding one or more blocks to the persistently-stored change block tracking log based on the comparison of the free block map as of the second time and the previously-stored copy of the free block map as of the first time; and including in the incremental backup at least a subset of blocks indicated in the persistently-stored change block tracking log as having had writes made to them subsequent to the first backup and at a least a subset of blocks included in the change block log.

2. The method of claim 1, wherein the persistent data storage comprises a local disk or other local drive.

3. The method of claim 1, further comprising extracting the free block map from a file system with which the data to be backed up is associated.

4. The method of claim 1, wherein tracking in a persistently-stored change block tracking log writes made subsequent to the first backup to blocks not listed as free in the copy of the free block map as of the first time further includes intercepting a write to a sector or block; checking the in-memory change block tracking log to determine whether the sector or block has been marked as modified; marking the sector or block as modified if the sector or block has not already been marked as modified; and propagating the change to the persistently-stored change block tracking log.

5. The method of claim 1, further comprising receiving an indication that a system with which the data to be backed up is associated has crashed or rebooted.

6. The method of claim 5, further comprising reading from the persistent data storage the previously-stored copy of the free block map as of the first time; and using data from the previously-stored copy of the free block map as of the first time to pre-mark as modified in the in-memory change block tracking log at least a subset of blocks listed as free in the free block map as of the first time.

7. A system to back up data, comprising:
a persistent data storage device; and
a processor coupled to the persistent data storage device and configured to:
store on the persistent data storage device a copy of a free block map as of a first time associated with a first backup;
in response to the first backup,
premark all blocks in the free block map that were identified as free at a time of the first backup as modified;

premark all blocks in a persistently-stored change block tracking log that were identified as free at a time of the first backup as modified;

track in the persistently-stored change block tracking log writes made subsequent to the first backup to blocks not listed as free in the copy of the free block map as of the first time, including logging only writes to sectors or blocks that were not identified as free as of the time of the first backup;

for each block write operation, determine whether a block associated with the block write operation is identified as modified in the persistently-stored change block tracking log, and in the event that the block is identified as modified in the persistently-stored change block tracking log, maintain an indication of the block in the persistently-stored change block tracking log as being modified; and in the event that the block is not identified as modified in the persistently-stored change block tracking log, update the persistently-stored change block tracking log to identify the block as modified;

determine that an incremental backup is to be performed at a second time subsequent to the first time;

determine which blocks listed as free in the free block map as of the first time have been written to since the first time based at least in part on comparing a free block map as of the second time and the previously-stored copy of the free block map as of the first time;

add one or more blocks to the persistently-stored change block tracking log based on the comparison of the free block map as of the second time and the previously-stored copy of the free block map as of the first time; and include in the incremental backup at least a subset of blocks indicated in the persistently-stored change block tracking log as having had writes made to them subsequent to the first backup at a least a subset of blocks included in the change block log.

8. The system of claim 7, wherein the persistent data storage device comprises a local disk or other local drive.

9. The system of claim 7, further comprising extracting the free block map from a file system with which the data to be backed up is associated.

10. The system of claim 7, wherein tracking in a persistently-stored change block tracking log writes made subsequent to the first backup to blocks not listed as free in the copy of the free block map as of the first time further includes intercepting a write to a sector or block; checking the in-memory change block tracking log to determine whether the sector or block has been marked as modified; marking the sector or block as modified if the sector or block has not already been marked as modified; and propagating the change to the persistently-stored change block tracking log.

11. The system of claim 7, wherein the processor is further configured to receive an indication that a system with which the data to be backed up is associated has crashed or rebooted.

12. The system of claim 11, wherein the processor is further configured to read from the persistent data storage the previously-stored copy of the free block map as of the first time; and use data from the previously-stored copy of the free block map as of the first time to pre-mark as modified in the in-memory change block tracking log at least a subset of blocks listed as free in the free block map as of the first time.

13. A computer program product to back up data, the computer program product being embodied in a non-transitory computer readable storage medium and comprising computer instructions for:
    storing in persistent data storage a copy of a free block map as of a first time associated with a first backup;
    in response to the first backup,
        premarking all blocks in the free block map that were identified as free at a time of the first backup as modified;
        premarking all blocks in a persistently-stored change block tracking log that were identified as free at a time of the first backup as modified;
    tracking in the persistently-stored change block tracking log writes made subsequent to the first backup to blocks not listed as free in the copy of the free block map as of the first time, including logging only writes to sectors or blocks that were not identified as free as of the time of the first backup;
    for each block write operation, determining whether a block associated with the block write operation is identified as modified in the persistently-stored change block tracking log, and
    in the event that the block is identified as modified in the persistently-stored change block tracking log, maintaining an indication of the block in the persistently-stored change block tracking log as being modified; and in the event that the block is not identified as modified in the persistently-stored change block tracking log, updating the persistently-stored change block tracking log to identify the block as modified;
    determining that an incremental backup is to be performed at a second time subsequent to the first time;
    determining which blocks listed as free in the free block map as of the first time have been written to since the first time based at least in part on comparing a free block map as of the second time and the previously-stored copy of the free block map as of the first time;
    adding one or more blocks to the persistently-stored change block tracking log based on the comparison of the free block map as of the second time and the previously-stored copy of the free block map as of the first time; and
    including in the incremental backup at least a subset of blocks indicated in the persistently-stored change block tracking log as having had writes made to them subsequent to the first backup and at a least a subset of blocks included in the change block log.

14. The computer program product of claim 13, further comprising computer instructions for extracting the free block map from a file system with which the data to be backed up is associated.

15. The computer program product of claim 13, wherein tracking in a persistently-stored change block tracking log writes made subsequent to the first backup to blocks not listed as free in the copy of the free block map as of the first time further includes intercepting a write to a sector or block; checking the in-memory change block tracking log to determine whether the sector or block has been marked as modified; marking the sector or block as modified if the sector or block has not already been marked as modified; and propagating the change to the persistently-stored change block tracking log.

16. The computer program product of claim 13, further comprising receiving an indication that a system with which the data to be backed up is associated has crashed or rebooted.

17. The computer program product of claim 16, further comprising computer instructions for reading from the persistent data storage the previously-stored copy of the free block map as of the first time; and using data from the previously-stored copy of the free block map as of the first time to pre-mark as modified in the in-memory change block tracking log at least a subset of blocks listed as free in the free block map as of the first time.

* * * * *